United States Patent
Eswara et al.

(10) Patent No.: US 10,885,606 B2
(45) Date of Patent: Jan. 5, 2021

(54) SYSTEM AND METHOD FOR ANONYMIZING CONTENT TO PROTECT PRIVACY

(71) Applicant: Honeywell International Inc., Morris Plains, NJ (US)

(72) Inventors: Lalitha M. Eswara, Bangalore (IN); Abhisekh Jain, Mandurai (IN); Ismaiel Shaik, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/378,379

(22) Filed: Apr. 8, 2019

(65) Prior Publication Data
US 2020/0320665 A1   Oct. 8, 2020

(51) Int. Cl.
*G06T 3/00* (2006.01)
*G06T 7/90* (2017.01)
*G06T 7/194* (2017.01)

(52) U.S. Cl.
CPC .......... *G06T 3/0093* (2013.01); *G06T 7/194* (2017.01); *G06T 7/90* (2017.01); *G06T 2207/10016* (2013.01); *G06T 2207/10024* (2013.01); *G06T 2207/30196* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,103,488 A | * | 4/1992 | Gemello | G06K 9/66 348/26 |
| 6,317,795 B1 | | 11/2001 | Malkin et al. | |
| 6,661,918 B1 | * | 12/2003 | Gordon | G06K 9/38 382/164 |
| 8,098,904 B2 | * | 1/2012 | Ioffe | G06K 9/00281 382/118 |
| 8,406,482 B1 | * | 3/2013 | Chien | G06K 9/4652 382/118 |
| 8,514,293 B2 | * | 8/2013 | Matsumoto | H04N 5/772 348/222.1 |
| 9,020,261 B2 | | 4/2015 | Lipton et al. | |
| 9,398,280 B2 | | 7/2016 | Nikkanen et al. | |

(Continued)

FOREIGN PATENT DOCUMENTS

| | | |
|---|---|---|
| EP | 3039864 B1 | 9/2018 |
| WO | 2017129804 A1 | 3/2017 |

OTHER PUBLICATIONS

"MAZPRO VMS, Video Management System," Honeywell, 4 pages, 2018.
Wang et al., "Detect and Locate Stranger Intrusion," AWS DeepLens, 6 pages, 2020.

*Primary Examiner* — Motilewa Good Johnson
(74) *Attorney, Agent, or Firm* — Seager Tufte & Wickhem LLP

(57) ABSTRACT

A video management system may identify moving objects in a scene, and may obscure the moving object. Additionally, the video management system may identify parts of the scene that are not moving, and may identify pixels having a color falling within a range which may be associated with human skin, and may obscure such pixels. The video management system may present an image to a monitor including the obscured moving object and the obscured pixels having the color falling within the range associated with human skin.

16 Claims, 12 Drawing Sheets

(56) References Cited

U.S. PATENT DOCUMENTS

| | | | |
|---|---|---|---|
| 9,530,045 B2 | 12/2016 | Wang et al. | |
| 9,542,735 B2* | 1/2017 | Shukla | H04N 5/23216 |
| 9,648,285 B2 | 5/2017 | Traff et al. | |
| 9,830,505 B2* | 11/2017 | Fithian | G06F 16/5866 |
| 2002/0140823 A1* | 10/2002 | Sakurai | H04N 5/232 |
| | | | 348/207.99 |
| 2004/0008773 A1* | 1/2004 | Itokawa | G01S 3/7864 |
| | | | 375/240.08 |
| 2004/0233283 A1* | 11/2004 | Kang | G08B 13/196 |
| | | | 348/143 |
| 2006/0013495 A1* | 1/2006 | Duan | G06K 9/38 |
| | | | 382/235 |
| 2007/0086675 A1* | 4/2007 | Chinen | G06T 11/00 |
| | | | 382/284 |
| 2007/0116328 A1* | 5/2007 | Sablak | G06K 9/00362 |
| | | | 382/103 |
| 2007/0153091 A1* | 7/2007 | Watlington | H04N 7/15 |
| | | | 348/208.14 |
| 2007/0273765 A1* | 11/2007 | Wang | G06K 9/00771 |
| | | | 348/152 |
| 2008/0106599 A1* | 5/2008 | Liu | G06K 9/00362 |
| | | | 348/143 |
| 2009/0041297 A1 | 2/2009 | Zhang et al. | |
| 2009/0315996 A1* | 12/2009 | Guler | G01S 3/7864 |
| | | | 348/169 |
| 2010/0026831 A1* | 2/2010 | Ciuc | G06K 9/00221 |
| | | | 348/222.1 |
| 2010/0119157 A1* | 5/2010 | Kameyama | H04N 19/115 |
| | | | 382/195 |
| 2011/0142338 A1* | 6/2011 | Do | G06K 9/00362 |
| | | | 382/165 |
| 2012/0007975 A1* | 1/2012 | Lyons | G06K 9/00771 |
| | | | 348/77 |
| 2012/0229630 A1* | 9/2012 | Huang | G06T 7/254 |
| | | | 348/143 |
| 2013/0308856 A1* | 11/2013 | Carpenter | G06K 9/00335 |
| | | | 382/164 |
| 2015/0117835 A1* | 4/2015 | Yabuuchi | G08B 13/19613 |
| | | | 386/230 |
| 2015/0213595 A1* | 7/2015 | Lee | H04N 7/18 |
| | | | 382/173 |
| 2015/0371611 A1* | 12/2015 | Raley | G06F 21/10 |
| | | | 345/629 |
| 2016/0019415 A1* | 1/2016 | Ra | G06F 16/51 |
| | | | 382/197 |
| 2016/0171332 A1* | 6/2016 | Kawano | G06K 9/00771 |
| | | | 382/173 |
| 2016/0269704 A1* | 9/2016 | Ohta | H04N 9/73 |
| 2017/0076142 A1* | 3/2017 | Chang | G06K 9/00281 |
| 2017/0142343 A1* | 5/2017 | Kawai | G06T 7/20 |
| 2017/0220816 A1* | 8/2017 | Matusek | G06F 21/6245 |
| 2018/0247136 A1* | 8/2018 | Singh | G06T 7/174 |
| 2018/0268240 A1* | 9/2018 | Loce | G06K 9/00228 |
| 2018/0330591 A1* | 11/2018 | Tilkin | G06K 9/00718 |
| 2019/0147601 A1* | 5/2019 | Kakuko | G06T 7/248 |
| | | | 382/103 |
| 2019/0236791 A1* | 8/2019 | Matsui | G06T 7/215 |
| 2019/0302963 A1* | 10/2019 | Harrison | G06F 3/0418 |

* cited by examiner

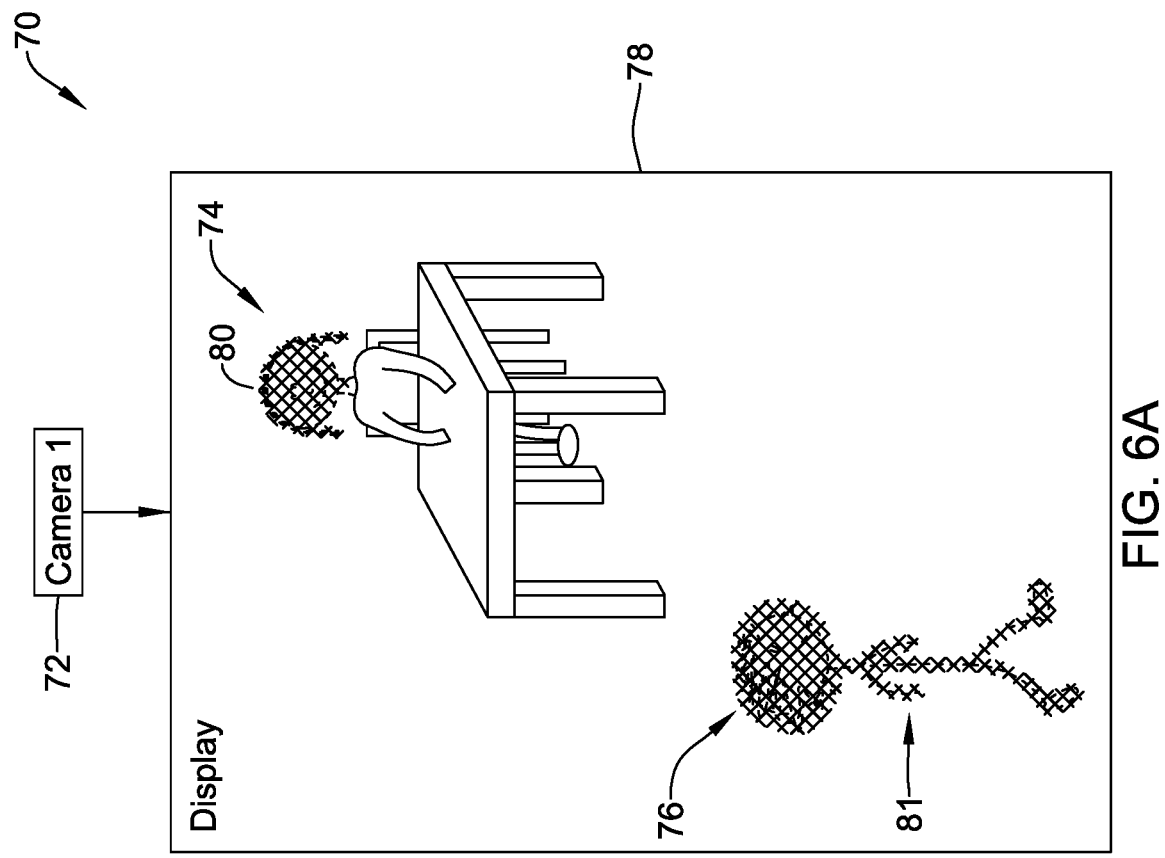

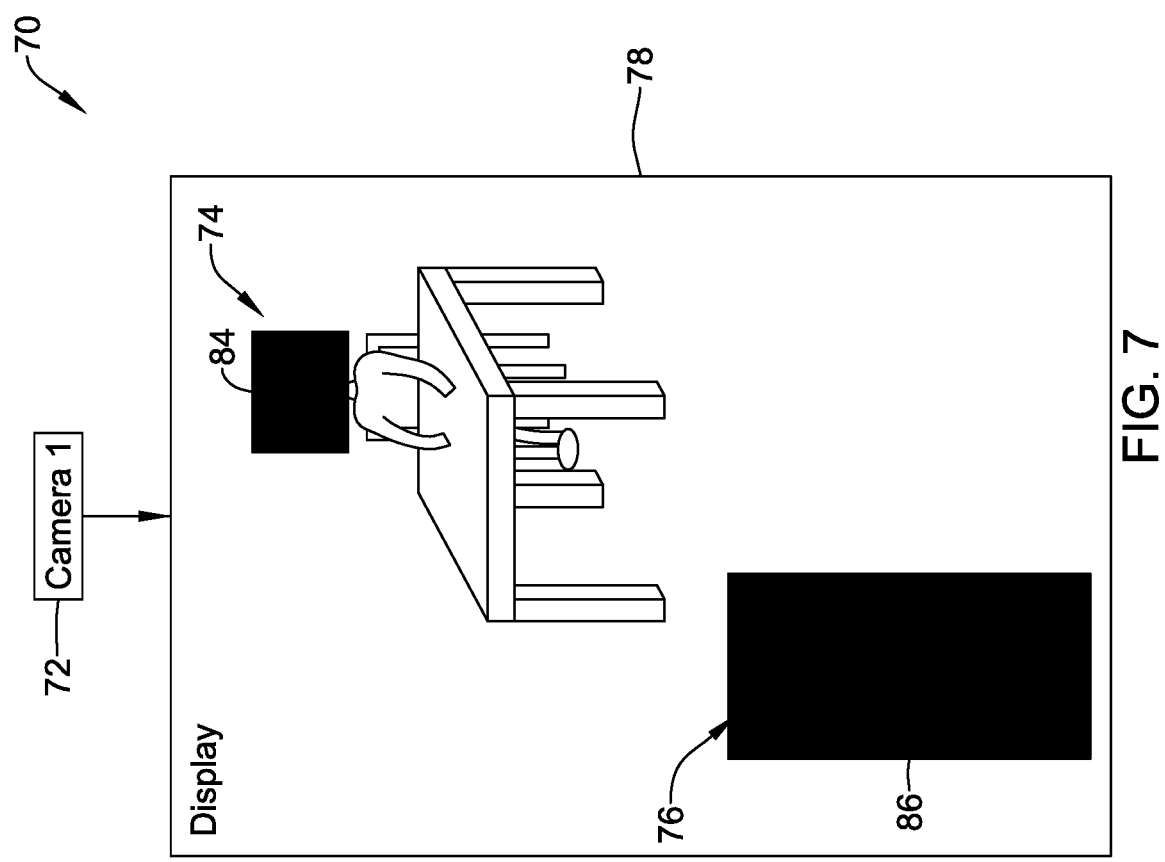

SYSTEM AND METHOD FOR ANONYMIZING CONTENT TO PROTECT PRIVACY

TECHNICAL FIELD

The present disclosure relates generally to video management systems and closed circuit television systems used in connection with surveillance systems. More particularly, the present disclosure relates to systems and methods for anonymizing the content shown in security images for privacy protection.

BACKGROUND

Known video management systems (VMS) and closed circuit television (CCTV) systems used in security surveillance can include a plurality of cameras and workstations. The cameras can be dispersed in a monitored area, and the workstation can display video data streams associated with the plurality of cameras. Operators or other users of such systems have access to the video data streams and are able to view, copy and export these streams, which may include images of people. In some cases, there is a desire to protect the identity of individuals who may otherwise be identified in displayed video images. In some cases, protecting the identity of individuals may include anonymizing the individuals shown in the video images.

A variety of techniques are known, such as pixelating or blurring portions of images that may otherwise show an individual's face. In some cases, background subtraction models may be used for detecting moving objects in video surveillance scenes. In background subtraction, a series of images may be received, and a model derived from these images may form the background. Upon establishing the background image, a foreground image (e.g., a moving object and/or person) may be extracted and anonymized. However, a problem arises when a person remains stationary for an extended period of time (e.g., sitting, standing still, lying down, etc.). In some cases, a stationary person may become part of the background image and consequently they will not be anonymized. Improvements in anonymizing content, whether moving or stationary, detected in video surveillance scenes would be desirable.

SUMMARY

The present disclosure relates generally to video management systems and closed circuit television systems used in connection with surveillance systems, and more specifically to systems and methods for anonymizing content shown in security images (e.g., closed circuit television (CCTV) videos) for privacy protection. Generally, the video management systems may identify moving objects in a scene, and may blur or otherwise obscure the moving objects. Additionally, the video management systems may identify parts of the scene that are not moving, and may identify pixels having a color falling within a range which may be associated with human skin, and may blur or otherwise obscure such pixels. The video management system may present an image to a monitor including the obscured moving object and the obscured pixels having the color falling within the range associated with human skin.

In one example, a method for displaying CCTV or security images on a surveillance monitor while maintaining privacy of humans shown in the images, wherein the images may be provided by a video camera, may include receiving an image from the video camera, identifying one or more objects that are moving in the image, and obscuring the one or more objects that are identified as moving in the image. The method may further include for at least those parts of the image that are not identified as containing any moving objects, identifying pixels that have a color falling within one or more defined color ranges that are associated with human skin, and obscuring pixels that are identified as having a color falling within the one or more defined color ranges. The method may include displaying a resulting image on a display, which may include any obscured moving objects and any obscured pixels that are identified as having a color falling within the one or more of the defined color ranges.

In another example, a method for displaying CCTV or security images on a surveillance monitor while maintaining privacy of humans shown in the images provided by a video camera is disclosed. The method includes receiving an image from the video camera and comparing the image to a background image to identify one or more regions of the image that are different from the background image and one or more regions of the image that are the same as the background image. The method may further include associating the one or more regions of the image that are different from the background image as one or more foreground regions, and associating the one or more regions of the image that are the same as the background image as one or more background regions. The method may include obscuring the one or more foreground regions, identifying one or more sub-regions within the one or more background regions that have a color that falls within one or more defined color ranges that are associated with human skin, and obscuring the one or more sub-regions within the one or more background regions that have a color that falls within one or more defined color ranges that are associated with human skin. In some cases, the method may further include displaying a resulting image on a display, wherein the image may include the obscured one or more foreground regions and the obscured one or more sub-regions within the one or more background regions that have a color that falls within one or more defined color ranges that are associated with human skin.

In another example, a non-transitory computer-readable medium may have instructions stored thereon that when executed by a video management system having a video camera may be configured to: receive an image from the video camera, compare the image to a background image to identify one or more regions of the image that are different from the background image and one or more regions of the image that are the same as the background image, associate the one or more regions of the image that are different from the background image as one or more foreground regions, associate the one or more regions of the image that are the same as the background image as one or more background regions, obscure the one or more foreground regions, and anonymize any human faces in the one or more background regions.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIG. 6A shows the illustrative scene of FIG. 5, as shown on an illustrative display wherein the stationary object and the moving object have been obscured by being pixelated;

FIG. 7 shows the illustrative scene of FIG. 5, as shown on an illustrative display wherein the stationary object and the moving object have each been obscured by a solid shape of a predetermined color;

Figure 1:
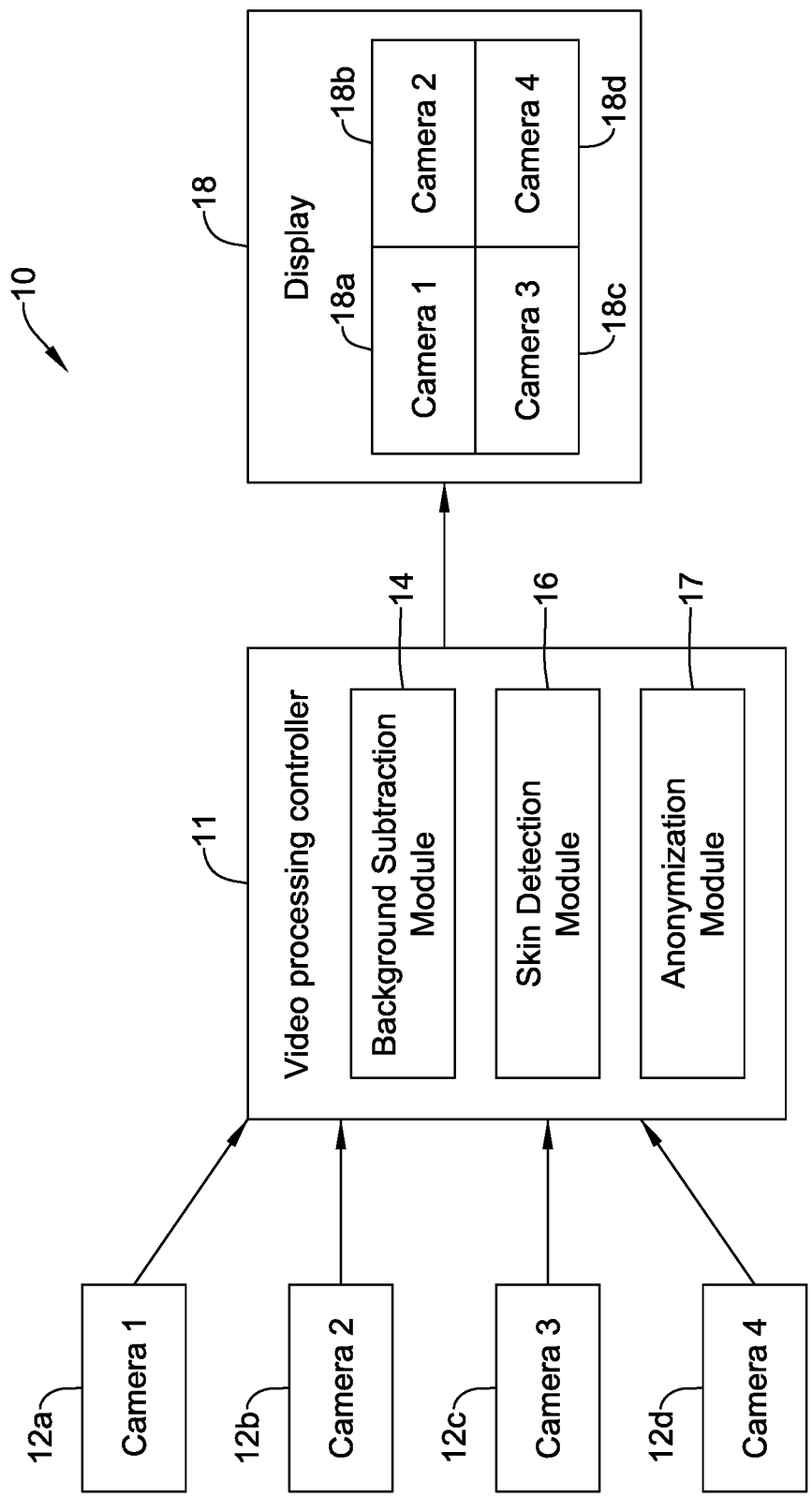
FIG. 1 is a schematic view of an illustrative video management system having a video processing controller in communication with one or more remotely located video surveillance cameras.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

The present disclosure relates generally to video management systems used in connection with surveillance systems. Video management systems may include, for example, a network connected device, network equipment, a remote monitoring station, a surveillance system deployed in a secure area, a closed circuit television (CCTV), security cameras, networked video recorders, and panel controllers. While video management systems with video processing controllers are used as an example below, it should be recognized that the concepts disclosed herein can be applied to video management systems more generally.

FIG. 1 is a schematic view of an illustrative video management system (VMS) 10 having a video processing controller 11 in communication with one or more remotely located video surveillance cameras 12a, 12b, 12c, and 12d (hereinafter generally referenced as cameras 12). While a total of four video surveillance cameras 12 are shown, it will be appreciated that this is merely illustrative, as there may be any number of video surveillance cameras 12. The video processing controller 11 may be configured to communicate with and control one or more components of the video management system 10. For example, the video processing controller 11 may communicate with the one or more components (e.g., cameras 12, and display 18) of the video management system 10 via a wired or wireless link (not shown). Additionally, the video processing controller 11 may communicate over one or more wired or wireless networks that may accommodate remote access and/or control of the video processing controller 11 via another device such as a smart phone, tablet, e-reader, laptop computer, personal computer, or the like. In some cases, the network may be a wireless local area network (LAN). In some cases, the network may be a wide area network or global network (WAN) including, for example, the Internet. In some cases, the wireless local area network may provide a wireless access point and/or a network host device that is separate from the video processing controller 11. In other cases, the wireless local area network may provide a wireless access point and/or a network host device that is part of the video processing controller 11. In some cases, the wireless local area network may include a local domain name server (DNS), but this is not required for all embodiments. In some cases, the wireless local area network may be an ad-hoc wireless network, but this is not required.

In some cases, the video processing controller 11 may be programmed to communicate over the network with an external web service hosted by one or more external web server(s). The video processing controller 11 may be configured to upload selected data via the network to the external web service where it may be collected and stored on the external web server. In some cases, the data may be indicative of the performance of the video management system 10. Additionally, the video processing controller 11 may be configured to receive and/or download selected data, settings and/or services sometimes including software updates from the external web service over the network. The data, settings and/or services may be received automatically from the web service, downloaded periodically in accordance with a control algorithm, and/or downloaded in response to a user request.

Depending upon the application and/or where the video management system user is located, remote access and/or control of the video processing controller 11 may be provided over a first network and/or a second network. A variety of remote wireless devices may be used to access and/or control the video processing controller 11 from a remote location (e.g., remote from the video processing controller 11) over the first network and/or the second network including, but not limited to, mobile phones including smart phones, tablet computers, laptop or personal computers, wireless network-enabled key fobs, e-readers, and/or the like. In many cases, the remote wireless devices are configured to communicate wirelessly over the first network and/or second network with the video processing controller 11 via one or more wireless communication protocols including, but not limited to, cellular communication, ZigBee, RED-LINK™, Bluetooth, WiFi, IrDA, dedicated short range communication (DSRC), EnOcean, and/or any other suitable common or proprietary wireless protocol, as desired.

Figure 2:
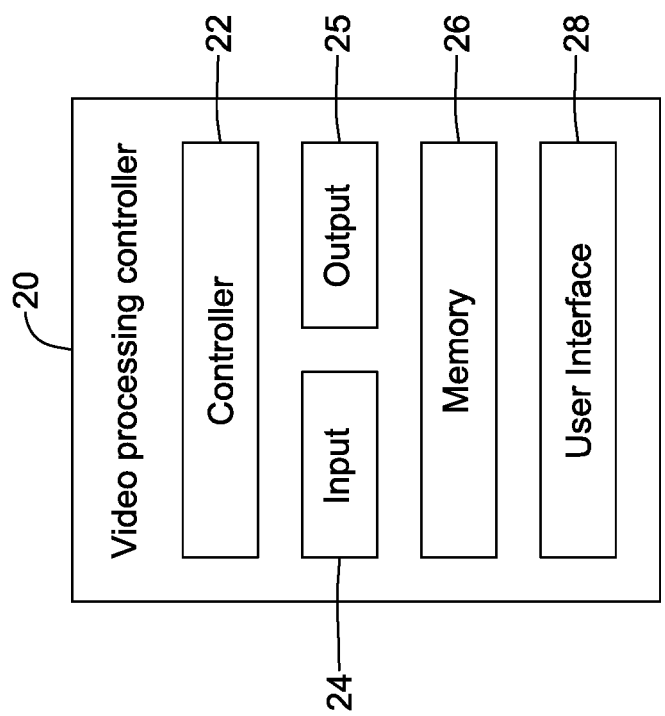
FIG. 2 is a schematic block diagram of an illustrative video processing controller of the video management system.

As discussed above, the video processing controller 11 may be in communication with the one or more remotely located video surveillance cameras 12. The cameras 12 may be located along a periphery or scattered throughout an area that is being watched by the cameras 12. The cameras 12 may be controlled via a control panel that may, for example, be part of the video processing controller 11. In some instances, the control panel (not illustrated) may be distinct from the video processing controller 11). It will be appreciated that in some cases, the video processing controller 11 may be located near one or more of the cameras 12. The video processing controller 11 may be remote from the cameras 12. In some cases, the video processing controller 11 may actually be disposed within one or more of the cameras 12. The video processing controller 11 may operate under the control of one or more programs loaded from a non-transitory computer-readable medium, such as a memory 26 as shown in FIG. 2. The video management system 10 may include a display 18, which may be used to display images provided by the cameras 12.

The video processing controller 11 may receive one or more images from cameras 12 and may process the images in order to protect the identity of any humans that could otherwise be identified in the images. In some cases, as shown, the video processing controller 11 may include a Background Subtraction Module 14, a Skin Detection Module 16 and an Anonymization Module 17. While discussed with respect to processing live or substantially live video feeds, it will be appreciated that stored images such as playing back video feeds, or even video clips, may be similarly processed.

As will be discussed, each of these Modules 14, 16, 17 play a part in processing images in order to protect the identity of any persons that could otherwise be detected within the images. For example, the Background Subtraction Module 14 may continually update a background image in order to look for moving objects. The moving objects may be people, or may be other moving objects. The Background Subtraction Module 14 may identify pixels that represent a moving object and takes steps to obscure the pixels that represent a moving object. In some cases, pixels representing one or more moving objects (e.g., one or more moving people) may be detected based on the difference between a current input video frame and the background image.

The Skin Detection Module 16 may be used to identify pixels which may have a color which falls within one or more color ranges associated with human skin, thereby identifying a person or persons within the background image. It will be appreciated that identified pixels that have a color falling within one or more color ranges associated with human skin may be form part of an image of a moving person or a stationary person. The Skin Detection Module 16 identifies these pixels and takes steps to obscure the pixels that are believed to represent human skin. In some cases, other objects, if a color that falls within one or more color ranges associated with human skin, may also be identified as being believed to be human skin. For example, if someone is wearing a shirt that is similar to a human skin color, the pixels representing that shirt may also be obscured.

As will be discussed, an output of the Background Subtraction Module 14 may be an image in which pixels believed to represent a moving object are identified and obscured. As an example, an output of the Background Subtraction Module 14 may be a binary image, in which all pixels denoted as representing a moving object are assigned a first color and all other pixels are assigned a second, different color. The pixels denoted as representing a moving object may be set equal to white while all other pixels are set equal to black. This is just an example. Similarly, an output of the Skin Detection Module 16 may be an image in which pixels believed to represent human skin are identified and obscured. As an example, an output of the Skin Detection Module 16 may be a binary image, in which all pixels denoted as representing human skin are assigned a first color and all other pixels are assigned a second, different color. The pixels denoted as representing human skin may be set equal to white, while all other pixels are set equal to black. This is just an example.

The images output by the Background Subtraction Module 14 and the images output by the Skin Detection Module 16 may pass through to the Anonymization Module 17. The Anonymization Module 17 may add the images together, and the result may be used as a guide as to which pixels in the original image are to be obscured in order to form an output image. The output image, which may include anonymized content, may then be transmitted to and rendered on a display 18.

As shown in FIG. 1, the display 18 is divided into quadrants, with an image originally provided by camera one, labeled as 12a, displayed within a display quadrant 18a, the image originally provided by camera two, labeled as 12b, displayed within a display quadrant 18b, the image originally provided by camera three, labeled as 12c, displayed within a display quadrant 18c, and the image originally provided by camera four, labeled as 12d, displayed within a display quadrant 18d. In some cases, if any of these images do not include any movement, and do not include any humans, the displayed images may be substantially identical to that originally captured by the original camera 12. If any of these images do include movement, and/or include images of humans, portions of these images may be blurred, pixelated or otherwise obscured when displayed within a particular quadrant of the display 18. It will be appreciated that the number of distinct images shown on the display 18 may correspond to the number of cameras. In some cases, there may be more cameras 12, and thus more images, than can be displayed simultaneously on the display 18. It will be appreciated that in some cases, the display 18 may be divided into any desired number of separate display sections.

FIG. 2 is a schematic block diagram of an illustrative video processing controller 20. In some instances, the video processing controller 20 may be considered as an example of the video processing controller 11 of FIG. 1. In some instances, the video processing controller 20 may include a controller 22. In some cases, the controller 22 enables or otherwise provides the functionality of the Background Subtraction module 14, the Skin Detection module 16, and the Anonymization Module 17 shown in FIG. 1. Accordingly, in some cases, the controller 22 may operate or otherwise manage a background subtraction method and/or a skin detection method, for example, and may ultimately output an image in which moving objects and/or instances of human skin are obscured in one fashion or another The video processing controller 20 includes a memory 26 for temporarily storing one or more images received from a video camera. The memory 26 may also store software that is used to provide the functionality of one or more of the Background Subtraction Module 14, the Skin Detection Module 16 and the Anonymization Module 17. The memory 26 may be any suitable type of storage device including, but not limited to, RAM, ROM, EPROM, flash memory, a hard drive, and/or the like. The video processing controller 20 may include a user interface 28 including a display and/or a data input device such as a keyboard, a keypad, a joystick, a touch pad, and the like, but this is not required. In some cases, the video processing controller 20 may additionally or alternatively include a remote user interface that facilitates a user's interactions with the video processing controller 20. The user interface may be provided by a number of remote internet devices, including a smart phone, a tablet computer, a laptop computer, or a desktop computer. In some cases, the user interface may communicate with the video processing controller 20 via a router such as, for example, a Wi-Fi or Internet router. In other cases, the user interface may be provided at the video processing controller 20 and share a common housing with the video processing controller 20, as indicated by the user interface 28.

The video processing controller 20 may further include one or more inputs 24 for receiving signals from a video camera (e.g., cameras 12) and/or receiving commands or other instructions from a remote location. The video processing controller 20 also includes one or more outputs 25 for providing processed images to the display 18. The controller 22 (e.g., a microprocessor, microcontroller, etc.), may be operatively coupled to the user interface 28, the memory 26, the one or more inputs 24 and/or the one or more outputs 25. As noted with respect to FIG. 1, the video processing controller 20 may be configured to receive signals from a plurality of cameras (such as the cameras 12a, 12b, 12c, and 12d, as shown in FIG. 1) that are positioned in different spaces within an area. In some cases, the video processing controller 20 may configured to receive a signal from the cameras 12 located throughout an area, via the one or more inputs 24. In some cases, the one or more inputs 24 may be a wireless receiver or a wireless transceiver. The cameras 12, as shown in FIG. 1, may include closed circuit television (CCTV) hardware, such as security cameras, networked video recorders, panel controllers, and/or any other suitable camera.

Figure 3:
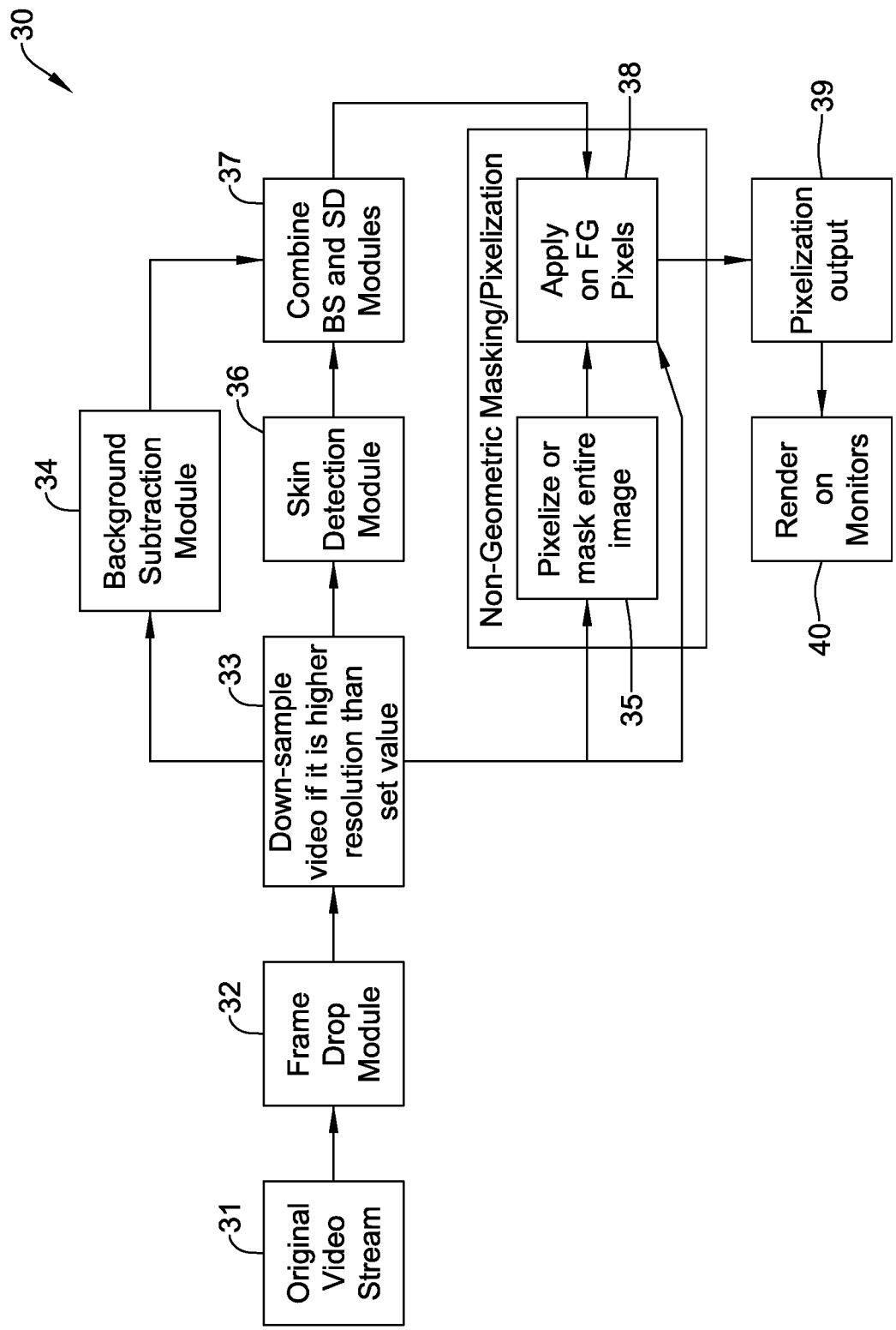
FIG. 3 is a schematic block diagram showing an illustrative method for anonymizing content received from a video surveillance camera.

FIG. 3 is a schematic block diagram showing an illustrative method 30 for anonymizing content received from a video source. A video processing controller (e.g., the video processing controller 20 as shown in FIG. 2) may receive an original video stream 31. The original video stream 31 may be received by the video processing controller from a video surveillance camera (e.g., the cameras 12 as shown in FIG. 1), which may be disposed within an area. The original video stream 31 may alternatively be a stored video or a video clip. The original video stream 31 may also be one or more static images. In some cases, the video processing controller 22 may be configured to implement a frame drop module 32, in which the video processing controller 22 intelligently drops frames on a high-frame rate video, which may for example be 30 frames per second, to achieve a lower frame rate of perhaps 10 frames per second. This may be done to effectively reduce the number of images that need to be processed without losing too much information. Moreover, and in order to reduce latency in high resolution video streams, such as 4K and above, the resolution of the video stream 31 is evaluated so as to determine whether or not the resolution of the video stream 31 falls within a preset value. If the resolution of the video stream 31 is higher than the preset value, the video stream 31 may be down-sampled to a resolution falling within the preset value for reducing the computational complexity, thereby producing a new image, as referenced at block 33. The preset value may be 720p, 1080p, and/or any other suitable resolution value.

Figure 4:
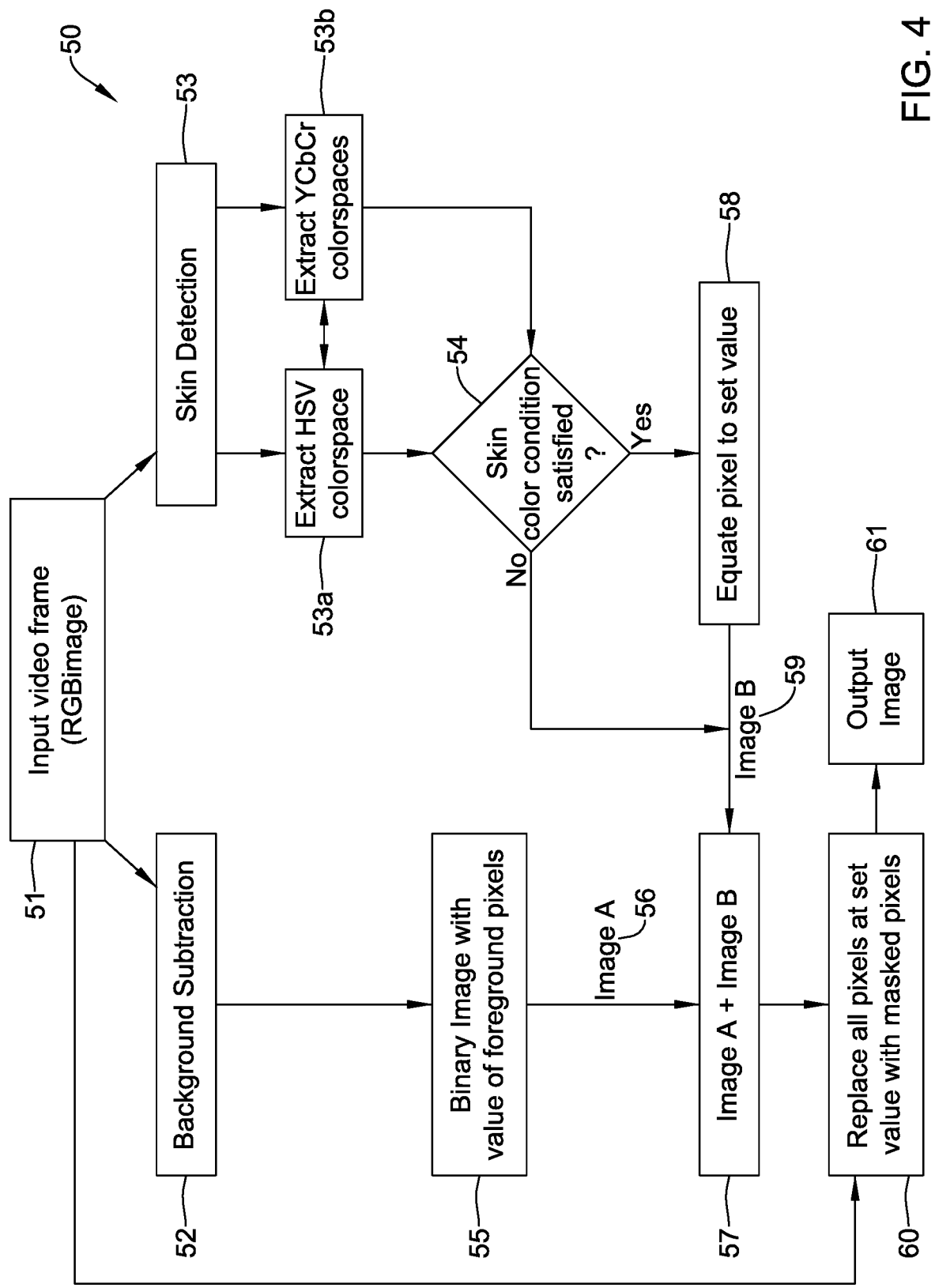
FIG. 4 is a schematic block diagram showing an illustrative method for anonymizing content received from a video surveillance camera.

The new image may then be passed through two modules, a Background Subtraction Module 34 and a Skin Detection Module 36, which are discussed further in reference to FIG. 4. When the new image is passed through the Background Subtraction Module 34, the output from the Background Subtraction Module 14 may be a binary, black and white image. The output from the Skin Detection Module 36 may also be a binary, black and white image. It will be appreciated that the Background Subtraction module 34 may be an example of the Background Subtraction module 14 and the Skin Detection module 36 may be an example of the Skin Detection module 16. The output from each of the Background Subtraction Module 34 and the Skin Detection Module 36 may be combined, as referenced at block 37. It will be appreciated that block 37 may be considered as being an example of the Anonymization Module 17 shown in FIG. 1. Accordingly, an output from block 37 may be a binary image in which white pixels may represent the regions to be obscured, and black pixels may represent the regions to remain unobscured.

As can be seen, the original image (once downsized if necessary) is also supplied to a block 35, where the entire image is pixelated. At block 38, the binary image output from block 37 is used as a guide, and each pixel in the original image that corresponds to a white pixel (for example) in the binary image output from block 37 is replaced using corresponding obscured pixels from the pixelated image created at block 35. In some cases, for example, each pixel within the original downsized image that needs to be obscured may be replaced with one or more obscured pixels from the pixelated image created at block 35. As an example, a 3×3 or 4×4 grid of pixels centered around a particular pixel within the original downsized image may be replaced with the corresponding 3×3 or 4×4 grid of obscured pixels from the pixelated image created at block 35.

The resulting output image, referenced at block 39, is transmitted to and rendered on a monitor, as referenced at block 40.

FIG. 4 is a schematic block diagram showing another illustrative method 50 for anonymizing content received from a video surveillance camera. A video processing controller may receive an input video frame (e.g., an RGB image), as referenced at block 51. The image received may be routed to a Background Subtraction Module 52 and a Skin Detection Module 53. The Background Subtraction module 52 may be considered as an example of the Background Subtraction Module 14. The Skin Detection Module 53 may be considered as an example of the Skin Detection Module 16.

In some cases, the Background Subtraction Module 52 may include a temporal average filter, a static background hypothesis, a Running Gaussian average, and/or any other suitable background subtraction model. The video processing controller may continually receive images from the video surveillance camera. The Background Subtraction Module 52 may use these images to continually update a background image. One or more moving objects (e.g., one or more moving people) may be detected based on the difference between a current input video frame and the background image. In some cases a binary image, e.g., a foreground image, may be produced having a set value of pixels, as referenced at block 55. The foreground image may include a moving object, indicated by Image A 56.

In some cases, the image received at block 51 may be passed through the Background Subtraction Module 52 and the Skin Detection Module 53 simultaneously, as shown in FIG. 4. In some cases, the image received at block 51 may be passed through the Background Subtraction Module 52 first and then the image may be passed through the Skin Detection Module 53. In some cases, the image received at block 51 may be passed through the Skin Detection Module 53 first and then the image may be passed through the Background Subtraction Module 52. The Skin Detection Module 53 may be used to identify pixels which may have a color which falls within one or more color ranges associated with human skin, thereby identifying a stationary person within the background image. In some cases, the Skin Detection Module 53 may include extracting HSV color spaces, as referenced at block 53*a*. In some cases, the Skin Detection Module 53 may further include extracting YCbCr color spaces, as referenced at block 53*b*. YCbCr color spaces refer to referencing colors in terms of one luminance component (Y) and two chrominance components (Cb and Cr). The SD Module 53 may perform a pixel-by-pixel extraction for HSV color spaces and/or YCbCr color spaces. At block 54, the Skin Detection Module 53 determines if the skin color condition is satisfied by performing an algorithm (rVal>bVal && (abs(rVal−gVal) <15 |rVal>gVal) && sVal>(th1* 255) && sVal<(th2*255)); th1=0.15; th2=0.8. This is just an example. The threshold values may vary based on illumination conditions. For example, the person may have a shadow over a portion of the exposed skin. In this case, the skin color condition algorithm may adjust accordingly. In some cases, an image in the background may include an article of clothing and/or another object having a color which falls within one or more color ranges associated with human skin. In such cases, the object having a color which falls within one or more color ranges associated with human skin may also be identified as a person (moving or stationary) within the background image.

When the skin color condition is satisfied, the background image is determined to include a person, and an image is produced having a set value of pixels, as referenced at block 58. The background may include a person, indicated by Image B 59. In some cases, when the skin color condition is not satisfied, it may be determined that there are no humans in the background image. In such cases, Image B 59 may be the same as the background image. At block 57, Image A 56 and Image B 59 are combined and the pixels having the set value of pixels may be replaced with masked pixels, as referenced at block 60. The set value of pixels may include 200 pixels, 255 pixels, 300 pixels, higher value pixels such as those greater than 250 pixels, or any other suitable value of pixels. The output image, at block 61, may be an image including any blurred moving objects and any blurred pixels that are identified as having a color falling within the one or more of the defined color ranges that can indicate skin color.

Figure 5:
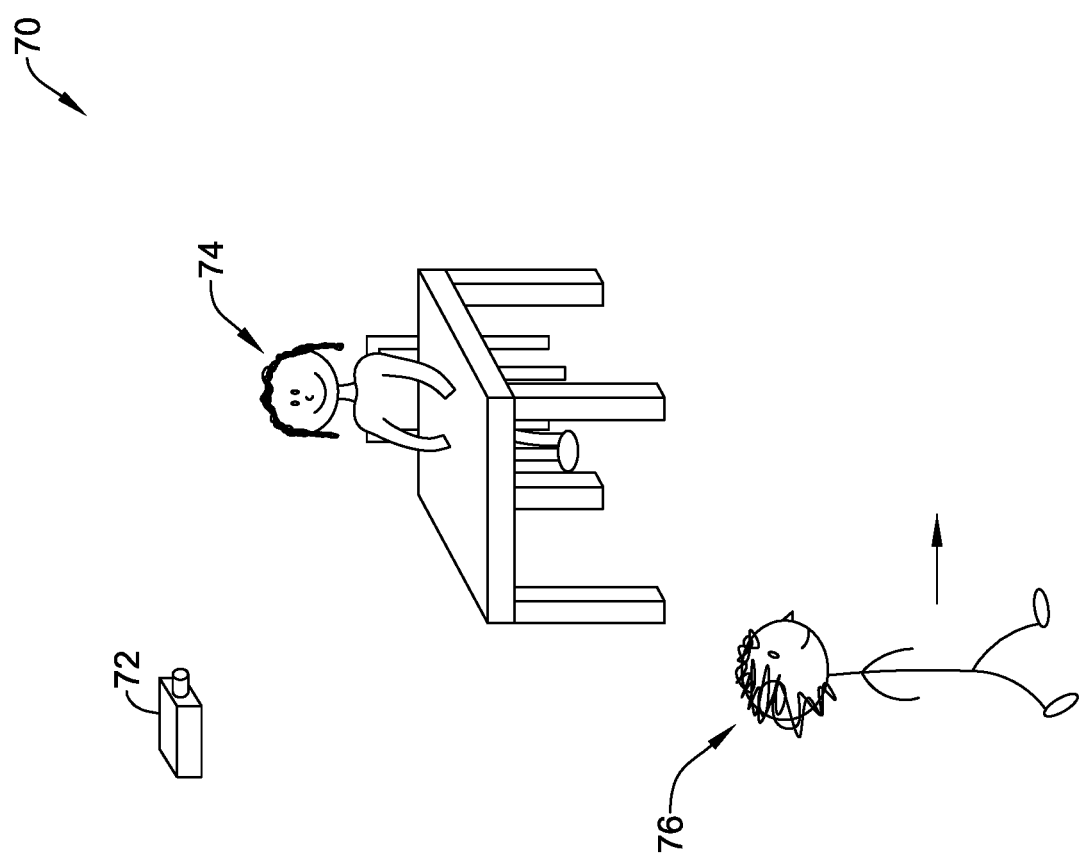
FIG. 5 shows an illustrative scene including a stationary object and a moving object.

FIG. 5 shows an illustrative scene 70 that may be captured by a video surveillance camera 72. In this example, the video surveillance camera 72 may be provided to monitor a secured area. As shown in this example, the secured area includes a stationary object 74 and a moving object 76. In some cases, as illustrated, the stationary object 74 is a person sitting at a table while the moving object 76 is a person walking through the secured area. The image may be captured by the camera 72 and transmitted to a video processing controller (such as the video processing controller 11 in FIG. 1). In some cases, the image may be processed to detect and obscure any moving objects and/or any stationary or moving humans. The image may then be passed through a Background Subtraction Module and a Skin Detection Module, and then an Anonymization Module. The output image may then be transmitted to a display 78, as shown in FIGS. 6A, 6B, 7, and 8.

FIG. 6A shows the illustrative scene 70 of FIG. 5, as shown on an illustrative display 78 wherein the stationary object 74 and the moving object 76 have been obscured by being pixelated using a pixelation module. The pixelation module may include using a resolution of the image (e.g., an input, an extrapolated, or an interpolated image) for determining a pixelation block size (PBS). An initial pixelation block size is determined and stored within the video management system 10. Equation 1 gives the pixelation block size that is automatically computed based on the image resolution:

$$PBS = \text{abs}\left(\frac{\frac{Im\_Rows}{IniBS} + \frac{Im\_Cols}{IniBS}}{2}\right), \quad \text{Equation 1}$$

where, Im_Rows is the number of rows of the input image, Im_Cols is the number of columns of the input image and IniBS is the initialized Block size.) The pixelation module may further contain changing the blur intensity according to the image size, similar to determining the PBS, as described above.

The pixelation module may further include evaluating the monitor screen size that may be used for rendering the image. The monitor may include a smart phone, tablet, e-reader, laptop computer, personal computer, or the like. The rendering window size may be calculated based on the screen handle, and these parameters are used to determine the Image Rows and Columns (e.g., the computation of PBS as given in Equation 1). The combination of pixelation block size and rendering window details may be used to automatically determine the preferred pixelation block size or blur intensity values. Pixelation block size may be relatively smaller when images are displayed on a mobile device such as a smartphone and may be relatively larger when images are displayed on a larger device such as a computer monitor, for example. In some cases, screen size may be a detectable parameter.

As discussed above, the moving object 76 may be found using the Background Subtraction Module 14, and the stationary object 74 may be found using the Skin Detection Module 16, which indicates the presence of colors indicative of human skin. In some cases the moving object 76 may be fully pixelated, as indicated by 81, because the object is in motion. In some cases, the stationary object 74 may only be pixelated in areas where the pixels may have a color which falls within one or more color ranges associated with human skin (e.g., face, hands, neck), as indicated by 80.

Figure 6B:
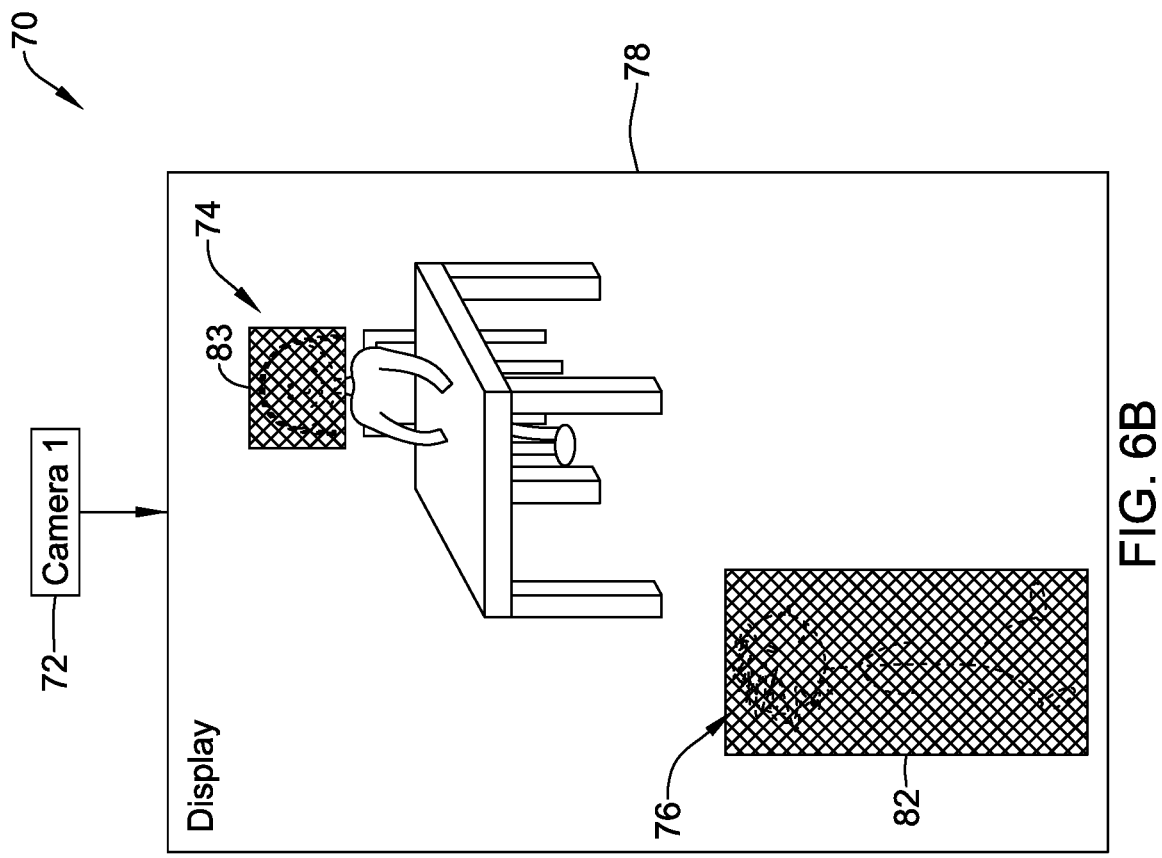
FIG. 6B shows the illustrative scene of FIG. 5, as shown on an illustrative display wherein the stationary object and the moving object have been obscured by a pixelated shape.

FIG. 6B shows the illustrative scene 70 of FIG. 5, as shown on an illustrative display 78 wherein the stationary object 74 and the moving object 76 have been obscured by a pixelated shape using a pixelation module. As discussed above with reference to FIG. 6A, the pixelation module may include using a resolution of the image (e.g., an input, an extrapolated, or an interpolated image) for determining a pixelation block size (PBS). An initial pixelation block size is determined and stored within the video management system 10. Equation 1 above gives the pixelation block size that is automatically computed based on the image resolution. The pixelation module may further contain changing the blur intensity according to the image size, similar to determining the PBS, as described above.

The pixelation module may further include evaluating the monitor screen size that may be used for rendering the image. The monitor may include a smart phone, tablet, e-reader, laptop computer, personal computer, or the like. The rendering window size may be calculated based on the screen handle, and these parameters are used to determine the Image Rows and Columns (e.g., the computation of PBS as given in Equation 1). The combination of pixelation block size and rendering window details may be used to automatically determine the preferred pixelation block size or blur intensity values.

As discussed above, the moving object 76 may be found using the Background Subtraction Module 14, and the stationary object 74 may be found using the Skin Detection Module 16, which indicates the presence of colors indicative of human skin. In some cases the moving object 76 may be fully pixelated, as indicated by 82, because the object is in motion. In some cases, the stationary object 74 may only be pixelated in areas where the pixels may have a color which falls within one or more color ranges associated with human skin (e.g., face, hands, neck), as indicated by 83.

FIG. 7 shows the illustrative scene 70 of FIG. 5, as shown on the display 78 wherein the stationary object 74 and the moving object 76 have been blurred by a predetermined color. In some cases, the moving object 76 may be fully blurred by a predetermined color (e.g., a black bar), as indicated by 86, because the object is in motion. In some cases, the stationary object 74 may only be blurred by a predetermined color in areas where the pixels may have a color which falls within one or more color ranges associated with human skin (e.g., face, hands, neck), as indicated by 84. In some cases, the predetermined color may be black, white, or any other suitable predetermined color.

Figure 8:
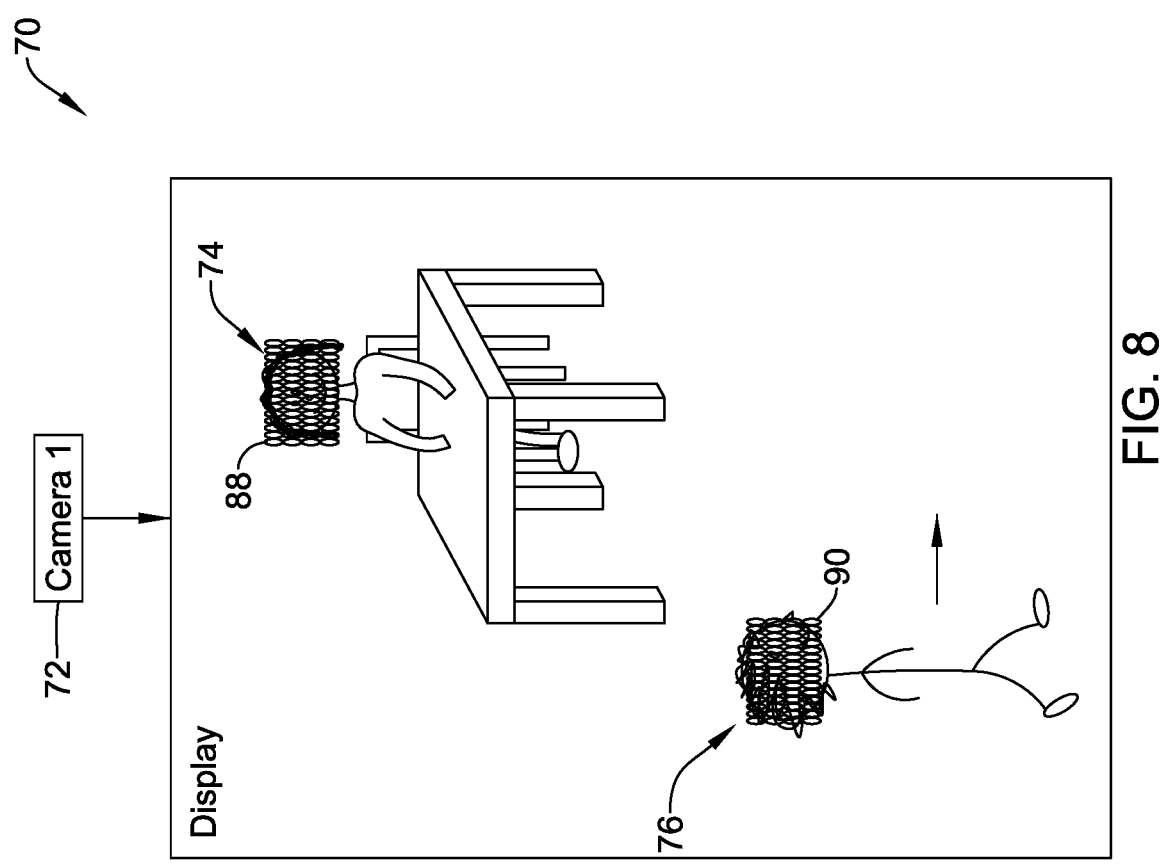
FIG. 8 shows the illustrative scene of FIG. 5, as shown on an illustrative display wherein the stationary object and the moving object have each been obscured by a fuzz ball.

FIG. 8 shows the illustrative scene 70 of FIG. 5, as shown on the display 78 wherein the stationary object 74 and the moving object 76 have each been obscured by a fuzz ball. In some cases, the moving object 76 may be found using the Background Subtraction Module 14, and the stationary object 74 may be found using the Skin Detection Module 16. In some cases, the moving object 76 may be obscured by a fuzz ball in areas where the pixels may have a color which falls within one or more color ranges associated with human skin (e.g., face, hands, neck), as indicated by 90. In some cases, the stationary object 74 may only be obscured by a fuzz ball in areas where the pixels may have a color which falls within one or more color ranges associated with human skin (e.g., face, hands, neck), as indicated by 84.

Figure 9:
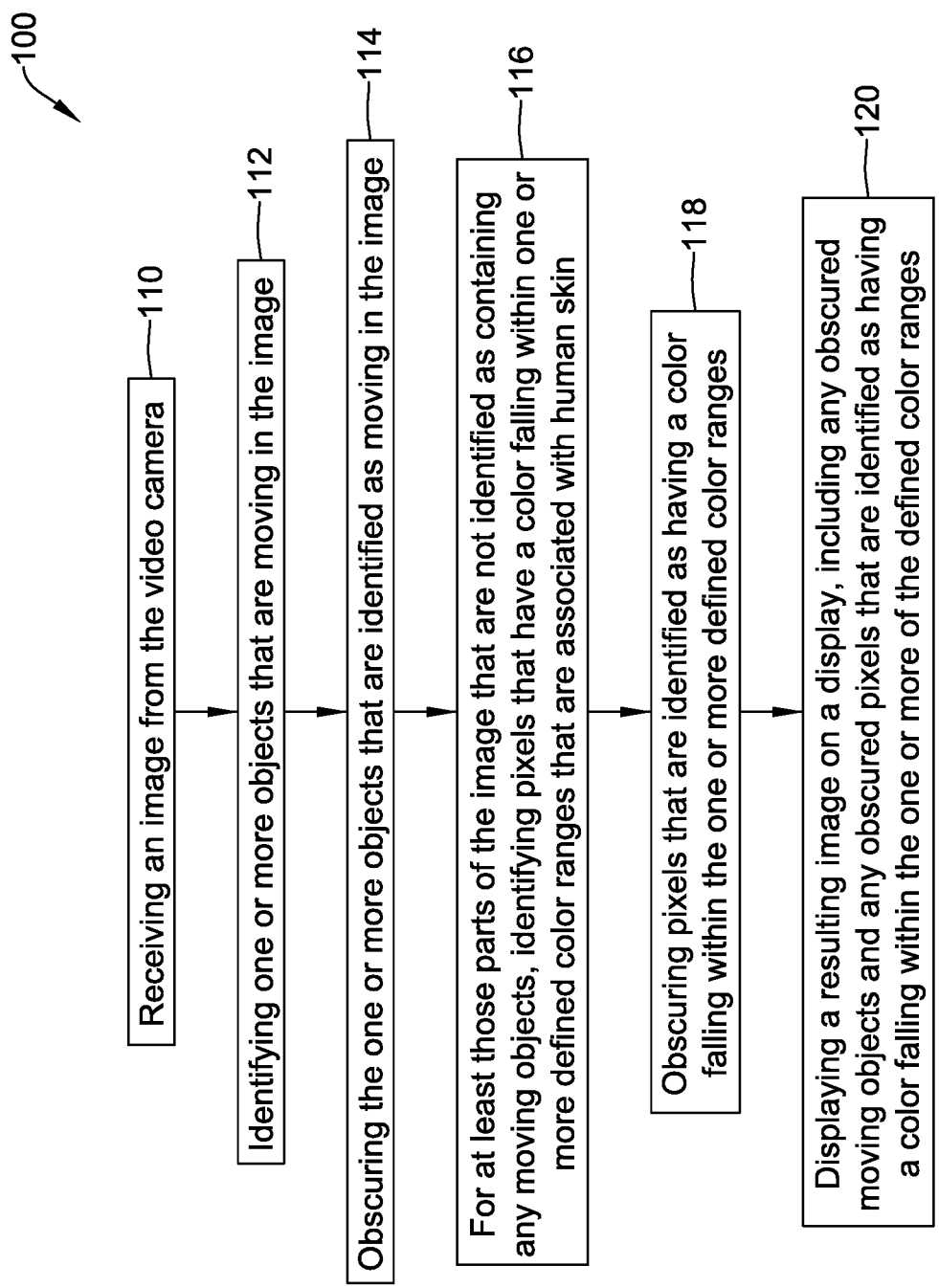
FIG. 9 is a flow diagram showing an illustrative method for anonymizing content received from a video surveillance camera.

FIG. 9 is a flow diagram showing an illustrative method 100 for anonymizing content received from a video surveillance camera. The method 100 may include displaying security images on a security monitor while maintaining the privacy of humans shown in the security images. The security images may be provided by a video camera. The method 100 may include receiving an image from the video camera, as referenced at block 110. The video processing controller may identify one or more objects that are moving in the image, as referenced at block 112, and may obscure (e.g., blurring, pixelating, fuzz ball, masking) the one or more objects that are identified as moving in the image, as referenced at block 114. For at least those parts of the image that are not identified as containing any moving objects, the video processing controller may further identify pixels that have a color falling within one or more defined color ranges that may be associated with human skin, as referenced at block 116. The pixels that are identified as having a color falling within the one or more defined color ranges may then be obscured (e.g., blurred, pixelated, fuzz ball, masked), as referenced at block 118, and a resulting image may be displayed on a display. The resulting image may include any obscured moving objects and any blurred pixels that are identified as having a color falling within the one or more of the defined color ranges, as referenced at block 120.

Identifying the one or more objects that are identified as moving in the image may include creating a background image. In some cases, the background image is periodically updated with a new background image. The image from the video camera may identify moving objects by comparing the image to the background image. Regions of the image that are different from the background image may be identified, and the regions that differ from the background image may be associated as corresponding to the one or more objects that may be moving in the image. In some cases, the image may be compared to the background image by performing a pixel-by-pixel subtraction between the image and the background image.

The one or more objects that are identified as moving in the image may be obscured by pixelating the one or more objects identified as moving, applying a fuzz ball over the image of the one or more objects identified as moving, setting the pixels of the one or more objects identified as moving to a predetermined color, and/or any other suitable method of obscuring. In some cases, the predetermined color may be black, white, gray, or any other suitable predetermined color.

The one or more defined color ranges that may be associated with human skin may include two or more defined color ranges, three or more defined color ranges, or any other suitable defined color ranges. The defined color ranges may each correspond to a different human race. In some cases, the pixels identified as having a color falling within the defined color ranges may be obscured by pixelating the pixels identified as having a color falling within the defined color ranges, by pixelating a group of pixels around each pixel that is identified as having a color falling within the defined color ranges, applying a fuzz ball over the pixels identified as having a color falling within the defined color ranges, setting the pixels identified as having a color falling within the defined color ranges to a predetermined color, and/or any other suitable method of obscuring. In some cases, the predetermined color may be black, white, gray, or any other suitable predetermined color.

Figure 10:
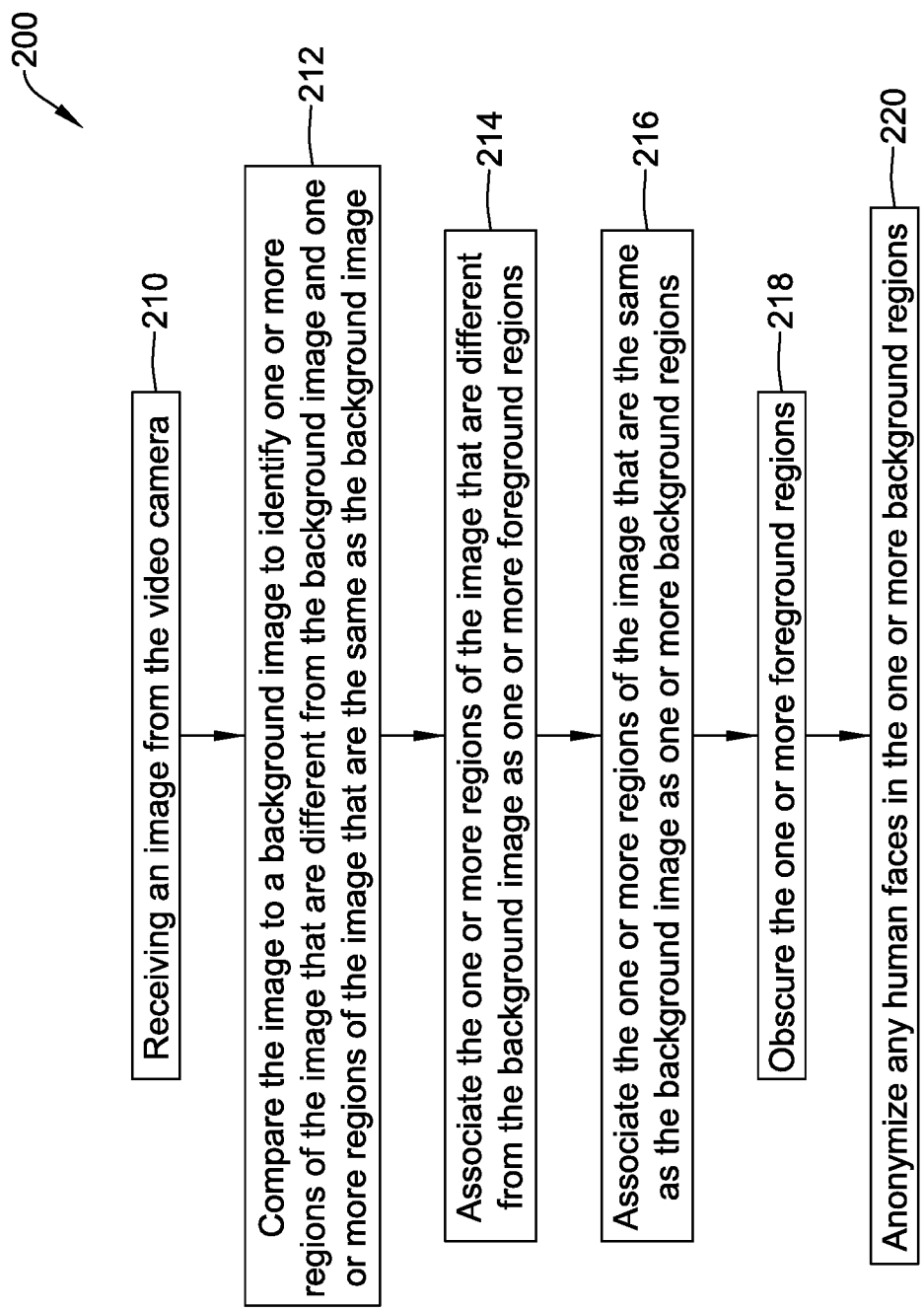
FIG. 10 is a flow diagram showing an illustrative method for anonymizing content received from a video surveillance camera.

FIG. 10 is a flow diagram showing an illustrative method 200 for anonymizing content received from a video surveillance camera. The method 200 may include receiving an image from the video camera, as referenced at block 210. The image may be compared to a background image so as to identify one or more regions of the image that may be different from the background image, and one or more regions of the image that may be the same as the background image, as referenced at block 212. In some cases, the background image may be updated with a new background image from time-to-time. The one or more regions of the image that may be different from the background image may be associated as one or more foreground regions, as referenced at block 214. The method 200 may further include associating the one or more regions of the image that may be the same as the background image, as one or more background regions, as referenced at block 216. The one or more foreground regions may be obscured, as referenced at block 218, and any human faces in the one or more background regions may further be anonymized, as referenced at block 220.

In some cases, the human faces in the one or more background regions may be identified by identifying regions of color that fall within one or more defined color ranges that are associated with human skin. The human faces in the background regions may be anonymized by obscuring (e.g., pixelating, applying a fuzz ball, blurring, etc.).

Figure 11:
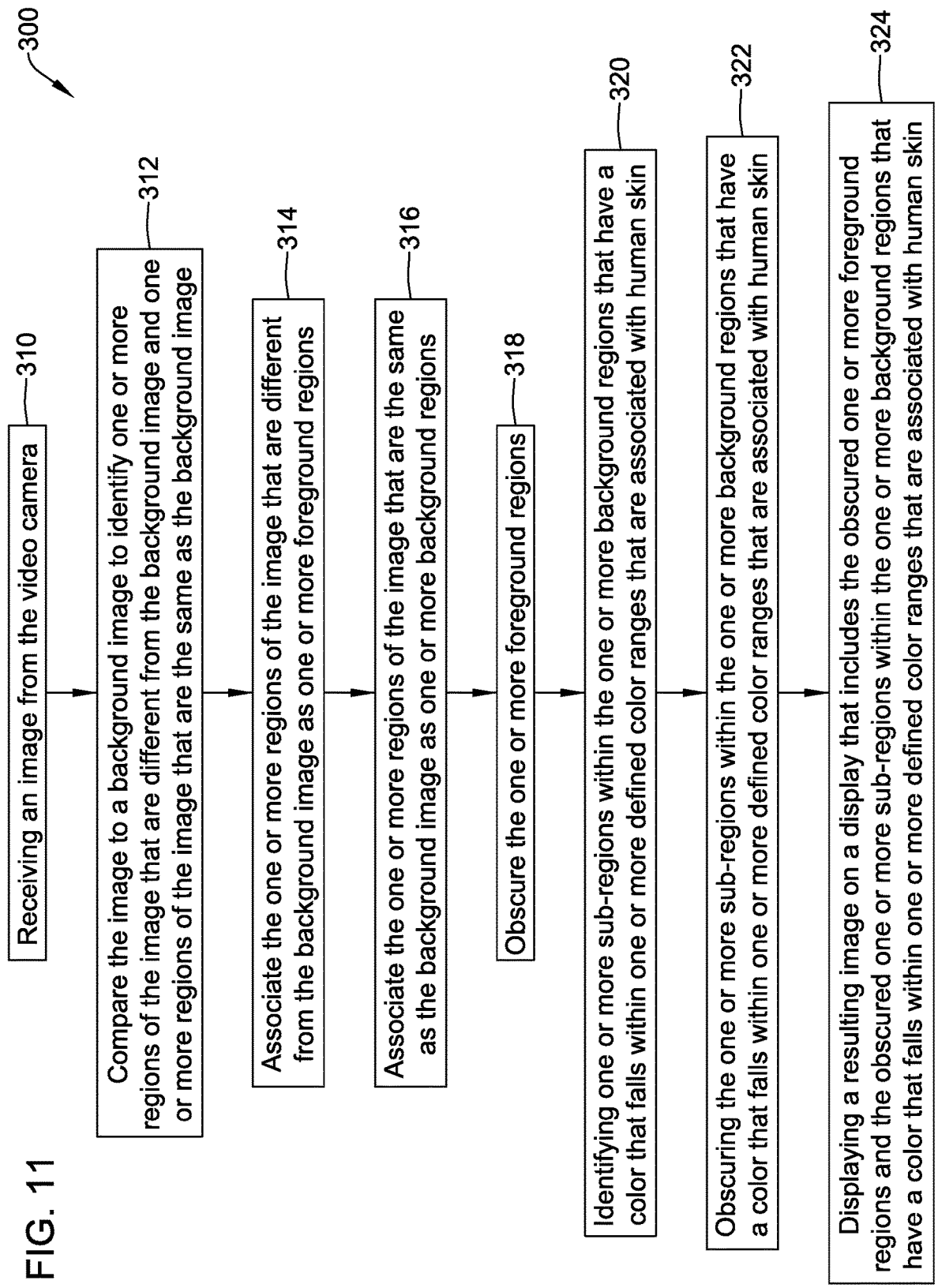
FIG. 11 is a flow diagram showing an illustrative method for anonymizing content received from a video surveillance camera.

FIG. 11 is a flow diagram showing an illustrative method 300 for the anonymization of content received from a video surveillance camera. The method 300 may include displaying security images on a security monitor while maintaining privacy of humans shown in the security images. The security images may be provided by a video camera. The method 300 may include receiving an image from the video camera, as referenced at block 210, and comparing the image to a background image to identify one or more regions of the image that may be different from the background image, and one or more regions of the image that may be the same as the background image, as referenced at block 312. The method 300 may include associating the one or more regions of the image that may be different from the background image as one or more foreground regions, as referenced at block 314, and associating the one or more regions of the image that may be the same as the background image as one or more background regions, as referenced at block 316. The method 300 may further include obscuring the one or more foreground regions, as referenced at block 318. One or more sub-regions within the one or more background regions that may have a color that falls within one or more defined color ranges that may be associated with human skin may then be identified, as referenced at block 320. The one or more sub-regions within the one or more background regions that may have a color that falls within one or more defined color ranges that may be associated with human skin may then be obscured, as referenced at block 322. A resulting image may be displayed on a display. The resulting image may include the obscured one or more foreground regions and the obscured one or more sub-regions within the one or more background regions that may have a color that falls within one or more defined color ranges that may be associated with human skin, as referenced at block 324.

In some cases, the background image is periodically updated with a new background image. In some cases, the image may be compared to the background image by performing a pixel-by-pixel subtraction between the image and the background image. In some cases, the background image may be a previous one of the images from the video camera.

Additional Embodiments

In one example, a method for displaying security images on a security monitor while maintaining privacy of humans shown in the security images, wherein the security images may be provided by a video camera, may include receiving an image from the video camera, identifying one or more objects that are moving in the image, and obscuring the one or more objects that are identified as moving in the image. The method may further include for at least those parts of the image that are not identified as containing any moving objects, identifying pixels that have a color falling within one or more defined color ranges that are associated with human skin, and obscuring pixels that are identified as having a color falling within the one or more defined color ranges. The method may include displaying a resulting image on a display, which may include any obscured moving objects and any obscured pixels that are identified as having a color falling within the one or more of the defined color ranges.

Alternatively, or in addition, identifying objects that are moving in the image may include, comparing the image to a background image, identifying regions of the image that are different from the background image, and associating the regions of the image that are different from the background image as corresponding to the one or more objects that are moving in the image.

Alternatively, or in addition, comparing the image to the background image may include performing pixel-by-pixel subtraction between the image and the background image.

Alternatively, or in addition, the background image may be periodically updated with a new background image.

Alternatively, or in addition, the one or more defined color ranges may include two or more defined color ranges.

Alternatively, or in addition, each of the at least two defined color ranges may correspond to a different human race Alternatively, or in addition, obscuring of the one or more objects that are identified as moving in the image may include pixelating the one or more moving objects.

Alternatively, or in addition, obscuring of the one or more objects that are identified as moving in the image may include fuzz balling the one or more moving objects.

Alternatively, or in addition, obscuring pixels may include pixelating a group of pixels around each pixel that is identified as having a color falling within the one or more defined color ranges.

Alternatively, or in addition, obscuring pixels may include applying a fuzz ball that includes the pixels that are identified as having a color falling within the one or more defined color ranges.

Alternatively, or in addition, obscuring pixels may include setting the pixels that are identified as having a color falling within the one or more defined color ranges to a predetermined color.

Alternatively, or in addition, obscuring pixels may include adjusting a pixelation block size in accordance with a detected screen size.

Alternatively, or in addition, the predetermined color may be black or white.

In some cases, a method for displaying security images on a security monitor while maintaining privacy of humans shown in the security images, wherein the security images may be provided by a video camera, may include, receiving an image from the video camera, comparing the image to a background image to identify one or more regions of the image that are different from the background image and one or more regions of the image that are the same as the background image. The method may further include associating the one or more regions of the image that are different from the background image as one or more foreground regions, and associating the one or more regions of the image that are the same as the background image as one or more background regions. The method may include obscuring the one or more foreground regions, identifying one or more sub-regions within the one or more background regions that have a color that falls within one or more defined color ranges that are associated with human skin, and obscuring the one or more sub-regions within the one or more background regions that have a color that falls within one or more defined color ranges that are associated with human skin. In some cases, the method may further include displaying a resulting image on a display, wherein the image may include the obscuring of one or more foreground regions and the obscured one or more sub-regions within the one or more background regions that have a color that falls within one or more defined color ranges that are associated with human skin.

Alternatively, or in addition, a new background image may be a previous one of the images from the video camera.

In some cases, a non-transitory computer-readable medium having instructions stored thereon that when executed by a video management system having a video camera may be configured to: receive an image from the video camera, compare the image to a background image to identify one or more regions of the image that are different from the background image and one or more regions of the image that are the same as the background image, associate the one or more regions of the image that are different from the background image as one or more foreground regions, associate the one or more regions of the image that are the same as the background image as one or more background regions, obscure the one or more foreground regions, and anonymize any human faces in the one or more background regions.

Alternatively, or in addition, human faces in the one or more background regions may be anonymized by blurring.

Alternatively, or in addition, the non-transitory computer-readable medium may further include: identify human faces in the one or more background regions by identifying regions of color that fall within one or more defined color ranges that are associated with human skin.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for displaying security images on a security monitor while maintaining privacy of humans shown in the security images, the security images provided by a video camera, the method comprising:
   receiving an image from the video camera;
   storing a background image from the video camera;
   comparing the image to the background image to identify one or more regions of the image that are different from the background image and one or more regions of the image that are the same as the background image;
   identifying one or more objects that are moving in the image as corresponding to those regions of the image that are different from the background image;
   obscuring the one or more objects that are identified as moving in the image;
   for at least those parts of the image that are not identified as containing any moving objects, identifying pixels that have a color falling within one or more defined color ranges that are associated with human skin;
   obscuring pixels that are identified as having a color falling within the one or more defined color ranges;
   displaying a resulting image on a display, including any obscured moving objects and any obscured pixels that are identified as having a color falling within the one or more of the defined color ranges; and
   repeatedly updating the background image with a new background image so that objects previously moving in the image that then become stationary in the image when the background image is updated with the new background image become part of the new background image.

2. The method of claim 1, wherein comparing the image to the background image comprises performing a pixel-by-pixel subtraction between the image and the background image.

3. The method of claim 1, wherein the one or more defined color ranges comprises two or more defined color ranges.

4. The method of claim 3, wherein each of at least two defined color ranges correspond to a different human race.

5. The method of claim 1, wherein obscuring of the one or more objects that are identified as moving in the image comprises pixelating the one or more moving objects.

6. The method of claim 1, wherein obscuring of the one or more objects that are identified as moving in the image comprises fuzz balling the one or more moving objects.

7. The method of claim 1, wherein obscuring pixels comprises pixelating a group of pixels around each pixel that is identified as having a color falling within the one or more defined color ranges.

8. The method of claim 1, wherein obscuring pixels comprises applying a fuzz ball that includes the pixels that are identified as having a color falling within the one or more defined color ranges.

9. The method of claim 1, wherein obscuring pixels comprises setting the pixels that are identified as having a color falling within the one or more defined color ranges to a predetermined color.

10. The method of claim 9, wherein obscuring pixels comprises adjusting a pixelation block size in accordance with a detected screen size.

11. A method for displaying security images on a security monitor while maintaining privacy of humans shown in the security images, the security images provided by a video camera, the method comprising:
    receiving an image from the video camera;
    comparing the image to a background image to identify one or more regions of the image that are different from the background image and one or more regions of the image that are the same as the background image;
    associating the one or more regions of the image that are different from the background image as one or more foreground regions;
    associating the one or more regions of the image that are the same as the background image as one or more background regions;

obscuring the one or more foreground regions;

identifying one or more sub-regions within the one or more background regions that have a color that falls within one or more defined color ranges that are associated with human skin;

obscuring the one or more sub-regions within the one or more background regions that have a color that falls within one or more defined color ranges that are associated with human skin;

displaying a resulting image on a display that includes the obscured one or more foreground regions and the obscured one or more sub-regions within the one or more background regions that have a color that falls within one or more defined color ranges that are associated with human skin; and repeatedly updating the background image with a new background image so that when one or more regions that differ from the background image remain as the background image is updated with the new background image, those one or more regions become part of the background image.

12. The method of claim 11, wherein comparing the image to the background image comprises performing a pixel-by-pixel subtraction between the image and the background image.

13. The method of claim 11, wherein the new background image is a previous one of the images from the video camera.

14. A non-transitory computer-readable medium having instructions stored thereon that when executed by a video management system having a video camera are configured to:

receive an image from the video camera;

store a background image from the video camera;

compare the image to the background image to identify one or more regions of the image that are different from the background image and one or more regions of the image that are the same as the background image;

associate the one or more regions of the image that are different from the background image as one or more foreground regions;

associate the one or more regions of the image that are the same as the background image as one or more background regions;

obscure the one or more foreground regions;

anonymize any human faces in the one or more background regions; and repeatedly update the background image with a new background image so that when one or more regions that differ from the background image remain as the background image is updated with the new background image, those one or more regions become part of the background image.

15. The non-transitory computer-readable medium of claim 14, wherein any human faces in the one or more background regions are anonymized by blurring.

16. The non-transitory computer-readable medium of claim 14, further comprising:

identify human faces in the one or more background regions by identifying regions of color that fall within one or more defined color ranges that are associated with human skin.

* * * * *